United States Patent [19]

Mutschler et al.

[11] 4,144,425
[45] Mar. 13, 1979

[54] STEERING COLUMN SWITCH MOUNTING

[75] Inventors: Erich Mutschler; Adam Weber, both of Bietigheim-Bissingen, Fed. Rep. of Germany

[73] Assignee: SWF-Spezialfabrik fur Autozubehor Gustave Rau GmbH, Fed. Rep. of Germany

[21] Appl. No.: 603,448

[22] Filed: Aug. 11, 1975
(Under 37 CFR 1.47)

[30] Foreign Application Priority Data

Aug. 12, 1974 [DE] Fed. Rep. of Germany ....... 2438654

[51] Int. Cl.² ............................................. H01H 3/00
[52] U.S. Cl. ................................................. 200/61.54
[58] Field of Search ............... 200/61.27, 61.35, 61.54, 200/293-296

[56] References Cited

U.S. PATENT DOCUMENTS

| 3,408,467 | 10/1968 | Shenstone et al. | 200/61.27 |
| 3,413,426 | 11/1968 | McClure et al. | 200/61.27 UX |
| 3,594,527 | 7/1971 | Brant et al. | 200/293 X |
| 3,727,021 | 4/1973 | Preis | 200/295 X |
| 3,766,351 | 10/1973 | Cryer | 200/61.27 X |
| 3,914,566 | 10/1975 | Wendling | 200/61.54 X |

FOREIGN PATENT DOCUMENTS 1936093 12/1970 Fed. Rep. of Germany ........ 200/61.54

Primary Examiner—James R. Scott
Attorney, Agent, or Firm—McGlew and Tuttle

[57] ABSTRACT

A steering column switch mounting for a steering column switch in which a contact carrier is rotatably mounted in a switch housing for movement by a switch lever, comprises a steering tube which is adapted to contain the steering column therein and which has an end rim with an exterior lock recess defined adjacent the end rim. A switch housing base plate has a cylindrical portion which is engaged over the steering tube and the cylindrical portion includes at least one resilient strip portion with an inwardly projecting locking stud which is biased into engagement with the lock recess defined on the steering tube.

4 Claims, 3 Drawing Figures

STEERING COLUMN SWITCH MOUNTING

FIELD AND BACKGROUND OF THE INVENTION

This invention relates in general to the construction of automobile steering switches and, in particular, to a new and useful steering column switch mounting for a steering column switch in which a contact carrier is rotatably mounted in a switch housing for movement by a switch lever and which comprises a switch housing base plate which has a cylindrical portion which is engaged over the end of the steering tube and which carries a resilient strip portion with a locking stud which is engageable into a recess of the tube in order to accurately position the switch housing base plate in respect to the steering tube.

DESCRIPTION OF THE PRIOR ART

The invention is particularly applicable to a steering column switch which comprises a carrier which is movable by a switch lever and in which the carrier is mounted in a switch housing which is secured to the end of the steering tube which receives the steering column. The known steering column switches are usually secured to the steering tube by screw connections. In some instances, clamps are also employed for joining the steering column switch to the steering tube. The known constructions have disadvantages inasmuch as they require a lot of mounting parts and require additional mounting work and thus are more expensive both to manufacture and to install.

SUMMARY OF THE INVENTION

In accordance with the invention, there is provided a steering column switch which is easily mountable on the steering tube. According to the invention, the switch housing base plate includes a cylindrical portion which is engaged over the end of the steering tube and which is precisely positioned in respect to the steering tube by means of a resilient portion of the cylindrical base plate which has a locking stud which engages into a recess defined on the tube at the switch orienting location. Advantageously, the base plate of the switch housing includes a cylindrical portion with elastic axially extending strip portions defined around its circumference which engage inwardly into exterior recesses defined around the steering tube adjacent its end. With such a construction, the mere insertion of the switch base plate over the steering column is sufficient to fix the switch housing in respect to the steering column. The defined position for the switch at the end of the steering tube is achieved by providing recesses in the exterior of the steering tube which provide a latch for engagement with a locking stud of the resilient strip portions of the switch housing base plate. The elastic strip portions of the cylindrical part of the switch base plate are advantageously made so that they are radially outwardly deflectable so that the stud formations at their ends may be deflected radially outwardly when they are inserted over the steering tube. They are sufficiently resilient so that they will deflect backwardly again when the studs align with the recesses of the steering tube and interengage therein.

The switch housing base plate is also advantageously designed as a contact carrier plate so that is is constructed with contacts spaced at locations around the steering tube as precisely defined by the recesses which lockably interengage with the studs on the resilient portions of the base plate. Additional locking means may be provided by forming recesses behind the resilient studs which may be reinforced by insert members which are positioned within the recesses to reinforce the resilient portion so that they cannot move radially inwardly and release the base plate.

The positioning of the base plate on the steering column may be more precisely defined by providing a stop collar on the exterior of the steering tube at a location chosen for the precise positioning of the switch housing. The elastic strip portions of the cylindrical part of the base plate are advantageously made so as to extend longitudinally and to be deflectable radially outwardly. The construction is also advantageously made so that an insert may be applied to the base plate to prevent the deflection and release of the studs from the steering tube.

Accordingly, it is an object of the invention to provide an improved steering column switch mounting for a steering column switch in which a contact carrier is rotatably mounted in a switch housing for movement by a switch lever and which comprises a steering tube having an end rim with an exterior recess adjacent the rim and with a switch housing base plate having a cylindrical portion which is engageable over the steering tube and which includes a resilient strip portion with an inwardly projecting locking stud biased into engagement with the lock recess on the steering tube.

A further object of the invention is to provide a steering switch mounting which includes a cylindrical base plate of the switch housing which is engageable over the end of the steering tube and which may be releasably locked thereto.

A further object of the invention is to provide a switch housing mounting on a steering column which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
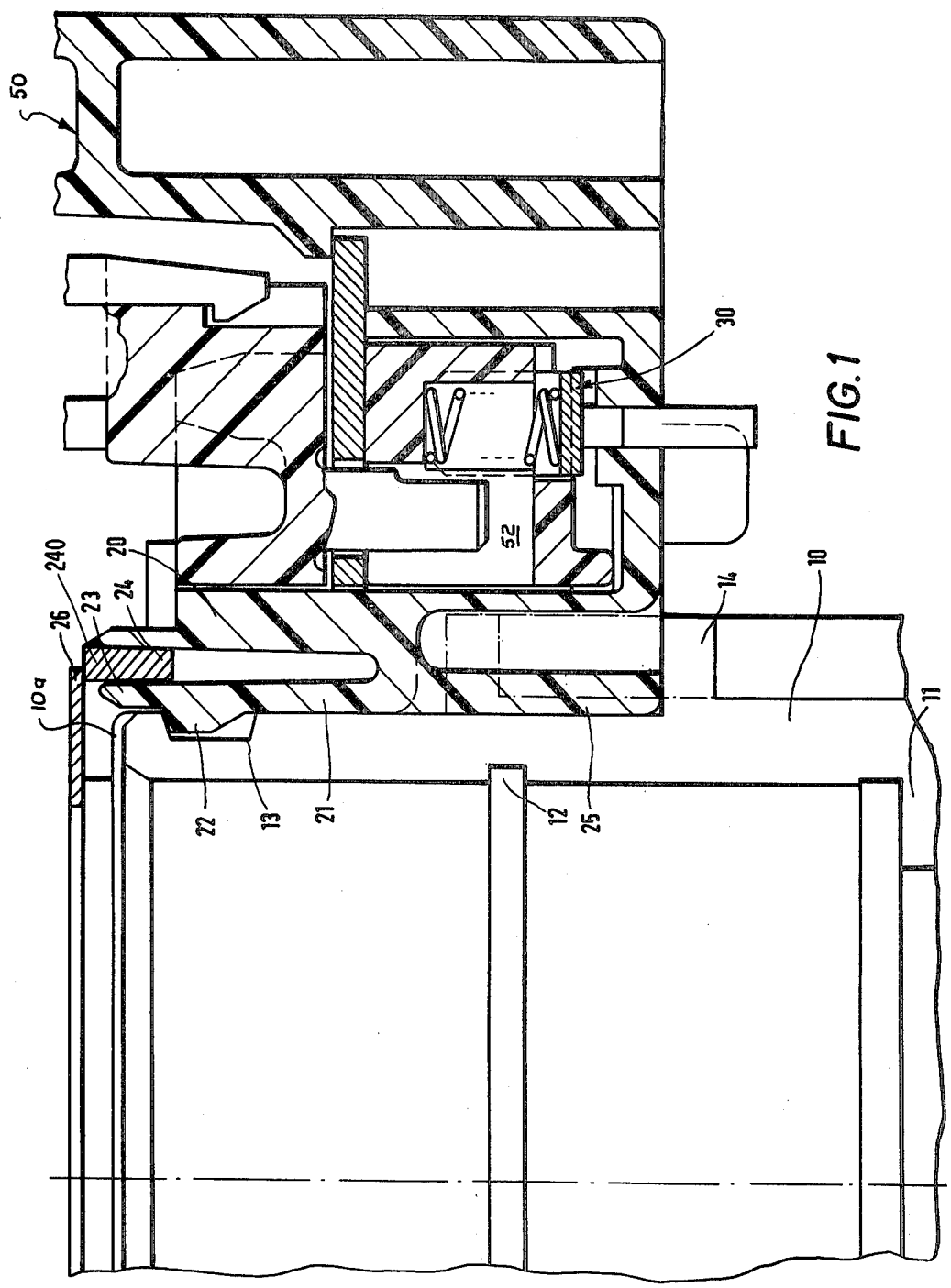
FIG. 1 is a partial axial sectional view of a steering tube having a switch housing mounting constructed in accordance with the invention.
Figure 3:
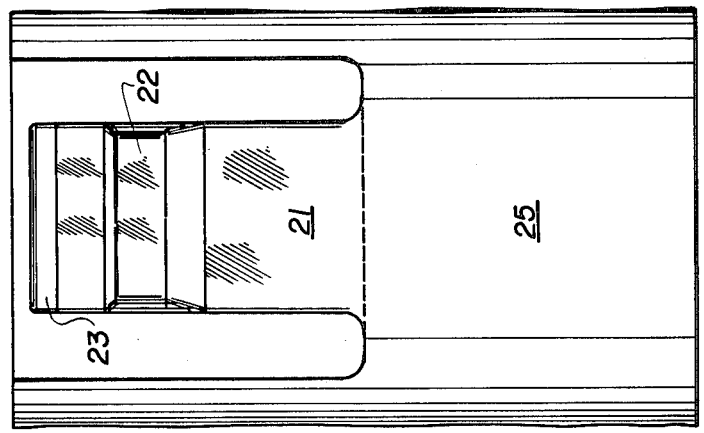
FIG. 3 is a partial end elevational view of the elastic strip portion of the bearing sleeve.
Figure 2:
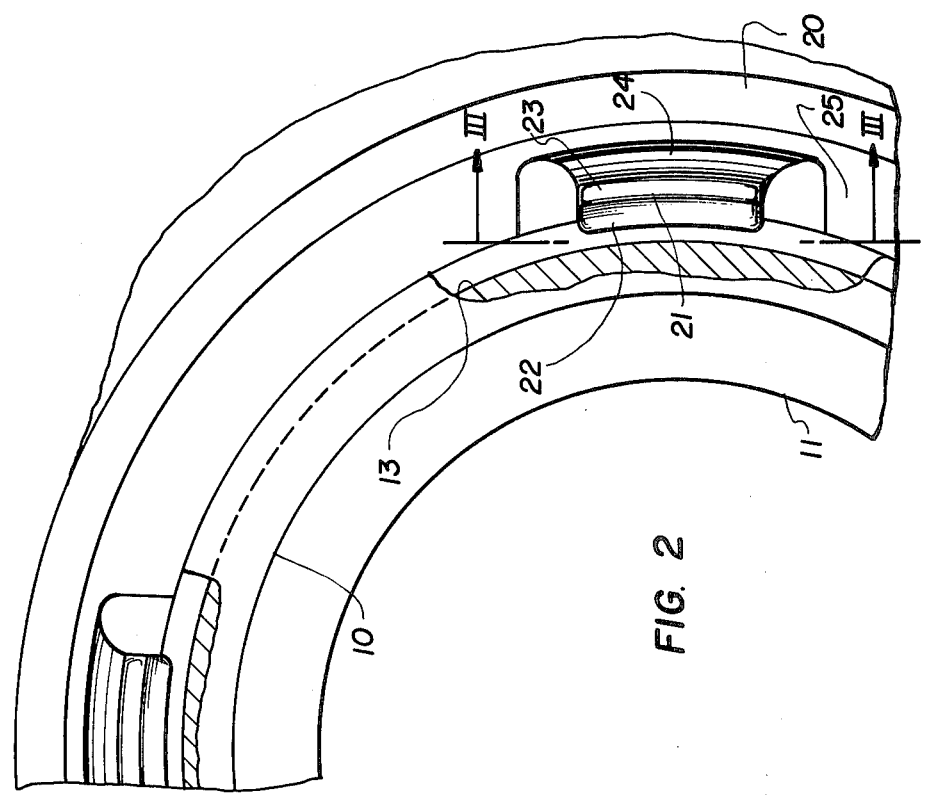
FIG. 2 is a partial top plus view of the steering tube and the bearing sleeve.

Referring to the drawing in particular, the invention embodied therein, comprises a steering column switch mounting for a steering column switch in which a contact carrier is rotatably mounted in a switch housing for movement by a switch lever. A steering tube 10 which is adapted to carry a steering column therein includes an internal shoulder 11 which forms a recess for a bearing for receiving a steering column (not shown), which is rotatably supported within steering tube 10. The bearing is fixed in the steering tube by means of a guard ring (not shown) which engages in an annular groove 12 defined on the interior of steering tube 10.

In accordance with the invention, the steering tube 10 has an end rim 10a and is provided with an exterior recess 13 adjacent end rim 10a which forms a locking recess for orienting a switch housing, generally designated 50, which is supported on steering tube 10.

The exterior of steering tube 10 is provided with a stop collar 14 forming a supporting ledge for the switch housing base plate 20. Switch housing base plate 20 advantageously comprises several annular or partially annular wall portions defining at least one cavity 52 for a switching unit, generally designated 30, which is only shown generally in the drawings and does not form a part of the invention and is, therefore, not described. The switch housing base plate 20 includes an inner cylindrical wall 25 forming a bearing sleeve which engages against the exterior of the steering tube 10. Bearing sleeve wall 25 is dimensioned so that it can be easily inserted over the end of steering tube 10 up to stop collar 14. Bearing sleeve wall 25 includes a plurality of elastic strip portions 21 made of a material and construction permitting its elastic deformation which extend longitudinally and are defined at spaced locations around its circumference. At least one of the elastic strips 21 includes a lock stud or projection 22 which is bevelled at one end in order to facilitate insertion of the stud 23 by outward radial movement and it engages in and locks with the recess 13 defined in the exterior wall of steering tube 10. The annular recess or a partially annular recess 24 is defined between the stud 23 and an inner wall 20 of the base plate 50 at locations behind each elastic strip 21. Strip 21 includes an outer end 23 which may be engaged and moved inwardly to release the entire switch housing base plate 20 and permit its withdrawal over the rim end 10a of steering tube 10. The circumference of bearing sleeve 25 can be provided with one or more of the elastic strips 21 which are preferably symmetrically distributed.

In accordance with a further feature of the construction, a locking recess 24 is shaped to accommodate a locking member 240 which may be inserted therein in order to anchor the switch housing base plate 20 on steering tube 10. The insert may be held in position by a disc 26 which is adapted to provide a support for a compression spring located between the steering tube and the steering wheel or steering column, which is not shown. An unintentional release of the steering column switch from the end of steering tube 10 is thus avoided. In such a way, all elastic strips can, of course, be secured with only one insert, if desired.

While a specific embodiment of the invention has been shown and described in detail to illustrate the application of the principles of the invention, it will be understood that the invention may be embodied otherwise without departing from such principles.

What is claimed is:

1. A device for securing a switch housing of a steering column switch to the end of a steering tube accomodating a steering column therein comprising, a bearing sleeve formed on the switch housing engaged over the end of the steering tube, said bearing sleeve having one end with a cut-out area spaced radially outwardly from the steering tube and extending substantially parallel to the steering tube, at least one resilient strip formed on said bearing sleeve interiorly of the cut-out area disposed adjacent the end of the steering tube, means defining a locking recess on the steering tube adjacent said resilient strip, and at least one snap-in extension projecting radially inwardly from said resilient strip and engaged into said locking recess, said snap-in extension being displaceable radially outwardly from the steering tube against the resiliency of said resilient strip and into the cut-out area of the bearing sleeve to disengage said snap-in extension from said locking recess on the steering tube.

2. A device according to claim 1, wherein said resilient strip extends in the longitudinal direction of the steering tube and further includes a release portion projecting beyond the end of the steering tube.

3. A device according to claim 2, further including an insert provided in said relieved cut-out area for preventing said snap-in extension from being displaced with said resilient strip into said cut-out area, and a disc provided over the end of the steering tube for retaining said insert in said cut-out area.

4. A device according to claim 1, further including a stop collar formed on the steering tube at a location to prevent the downward movement of said bearing sleeve on the steering tube.

* * * * *